(12) United States Patent
Raffel et al.

(10) Patent No.: US 8,651,549 B2
(45) Date of Patent: Feb. 18, 2014

(54) DEEP-DRAWN RECESS IN A PANEL

(75) Inventors: Knut Raffel, Braunschweig (DE); Tran Minh Dang, Wolfsburg (DE)

(73) Assignee: Volkswagen Aktiengesellschaft, Wolfsburg (DE)

(*) Notice: Subject to any disclaimer, the term of this patent is extended or adjusted under 35 U.S.C. 154(b) by 0 days.

(21) Appl. No.: 13/514,011

(22) PCT Filed: Nov. 26, 2010

(86) PCT No.: PCT/EP2010/007174
§ 371 (c)(1),
(2), (4) Date: Jul. 26, 2012

(87) PCT Pub. No.: WO2011/066924
PCT Pub. Date: Jun. 9, 2011

(65) Prior Publication Data
US 2012/0299335 A1    Nov. 29, 2012

(30) Foreign Application Priority Data

Dec. 5, 2009  (DE) .......................... 10 2009 057 169

(51) Int. Cl.
*B60J 7/00*    (2006.01)

(52) U.S. Cl.
USPC ....................................................... 296/37.2

(58) Field of Classification Search
USPC ......... 296/37.2, 37.14, 183.1, 193.07, 187.08
See application file for complete search history.

(56) References Cited

U.S. PATENT DOCUMENTS 3,595,335 A * 7/1971 Wessells et al. ......... 296/187.09
5,860,687 A   1/1999 Corporon et al.
(Continued)

FOREIGN PATENT DOCUMENTS

DE    102 29 752 A1    6/2004
DE    103 61 045 A1    7/2004
(Continued)

OTHER PUBLICATIONS

International Search Report for PCT International Application No. PCT/EP2010/007174, mailed on Feb. 22, 2011.
(Continued)

*Primary Examiner* — Joseph Pape
(74) *Attorney, Agent, or Firm* — Pearl Cohen Zedek Latzer Baratz LLP

(57) ABSTRACT

A recess (1') is proposed in a bottom panel (2') of a body, in particular of a vehicle body, having a recess bottom (4') which for its part merges into a recess wall (5'), wherein the recess (1') has one or more first bottom corrugations (3') which reinforce the recess bottom (4') and one or more first wall corrugations (6') which reinforce the recess wall (5'), wherein at least one first bottom corrugation (3') and at least one associated first wall corrugation (6') are arranged in a common vertical plane in such a way and are formed in such a way that the profile structure of the first bottom corrugation (3') adjoins the profile structure of the associated first wall corrugation (6') in the transition region from the recess bottom (4') to the recess wall (5'), and wherein the shaped-out portion of said first wall corrugation (6') is changed with regard to the shaped-out portion of the first bottom corrugation (3') in such a way that the first bottom corrugation (3') is formed towards the recess interior and the associated first wall corrugation (6') is formed towards the recess exterior or vice versa.

11 Claims, 12 Drawing Sheets

(56) References Cited

U.S. PATENT DOCUMENTS

| | | | | |
|---|---|---|---|---|
| 7,040,691 | B1 * | 5/2006 | Jacobs et al. | 296/193.07 |
| 2004/0140690 | A1 | 7/2004 | Watanabe et al. | |

FOREIGN PATENT DOCUMENTS

| | | | |
|---|---|---|---|
| DE | 10 2004 034072 A1 | 2/2006 |
| DE | 10 2005 052 041 A1 | 6/2006 |
| DE | 10 2007 027 782 A1 | 12/2008 |
| DE | 10 2008 054 206 A1 | 5/2010 |
| EP | 1247727 A2 | 10/2002 |
| EP | 1772355 A2 | 4/2007 |
| JP | 63 043874 A | 2/1988 |
| JP | 07-075992 B4 | 8/1995 |
| JP | 11208520 A | 8/1999 |
| JP | 2003-276530 | 10/2003 |

OTHER PUBLICATIONS

Search Report issued for German Patent Application No. 10 2009 054 169.8, mailed Dec. 23, 2012.

* cited by examiner

DEEP-DRAWN RECESS IN A PANEL

CROSS-REFERENCE TO RELATED APPLICATIONS

This application is a National Phase Application of PCT International Application No. PCT/EP2010/007174, International Filing Date Nov. 26, 2010, which claims priority to German Patent Application No. 10 2009 057 169.8, filed Dec. 5, 2009, each of which is hereby incorporated in its entirety.

FIELD OF THE INVENTION

The invention relates to a well in a plate, especially in the bottom plate of a vehicle body.

BACKGROUND OF THE INVENTION

Large, for instance, deep-drawn wells in car bodies, especially motor vehicles, such as, for example, trunk wells and spare-tire wells but also oil pans, have to have sufficient bottom stiffness and strength so that, first of all, they can withstand the stresses caused by the rated loads as well as by excessive loads and, secondly, they can shift natural vibrations of the bottom to a sufficiently high frequency range above a dominant excitation source, thus preventing resonances.

In order to meet these requirements, it has been a long-known procedure to reinforce such wells by means of profiled supports or so-called star-shaped supports, but this approach is associated with high costs and especially also with greater weight, as a consequence of which it runs counter to the lightweight construction envisaged by automotive manufacturers for environmental reasons. Furthermore, German laid-open document DE 102 29 752 A1 discloses reinforcing the bottom plate of the cargo area with a partition plate which, in turn, is inserted into the spare-tire well of the bottom plate of the cargo area perpendicular to the longitudinal axis thereof and which is welded to it.

Japanese specifications JP 63043874 A, JP 11208520 A and German laid-open document DE 103 61 045 A1 also disclose the procedure of reinforcing car body surfaces, especially the bottom surfaces of vehicles, by means of a plurality of generally known ribs created in the bottom surfaces, which can extend as bottom ribs from horizontal sections of the bottom surface all the way to vertical or almost vertical sections of the bottom surface, for example, in the area of a center tunnel, thus forming wall ribs. In actual practice, however, it can be seen that, especially in the case of deep-drawn wells involving a great drawing depth, the material is drawn irregularly in the area where the rib makes a transition from the well bottom to the well wall, as a result of which it tends to rupture.

Moreover, it has been found in actual practice that, precisely in the case of the above-mentioned deep wells, the well wall and particularly the transition of the rib from the horizontal to the vertical section of a well have such a significant effect that, wherever there are several adjacent ribs of the above-mentioned type, the edge area of the horizontal section or of the well bottom with respect to the vertical section or with respect to the well wall has an accordion-like configuration so to speak, and can hardly provide any stiffness in said edge area, so that, in spite of said rib reinforcement, a great deal of additional reinforcement potential remains unutilized. This is where the invention described below comes in.

SUMMARY OF THE INVENTION

It is the objective of the invention to employ simple and inexpensive measures in order to further increase the stiffness and strength of a well in a plate, especially in the bottom plate of a car body, while concurrently retaining the advantages of rib structures.

The envisaged objective is achieved accordingly by means of a well in a plate, especially in the bottom plate of a car body, having a well bottom which, in turn, makes a transition to a well wall, whereby the well has one or more first bottom ribs that reinforce the well bottom as well as one or more first wall ribs that reinforce the well wall, whereby at least one first bottom rib and at least one associated first wall rib are arranged in a shared vertical plane and are shaped in such a way that the profile structure of the first bottom rib adjoins the profile structure of the associated first wall rib in the transition area from the well bottom to the well wall, and whereby the shaping of said first wall rib with respect to the shape of the first bottom rib is changed in such a manner that the first bottom rib is shaped towards the inside of the well, while the associated first wall rib is shaped towards the outside of the well, or vice versa.

Through this measure, a so-called "zero passage", that is to say, an undeformed tension-stiff and compression-stiff area is created in the circumferential direction of the well in the transition area from the first bottom rib to the first wall rib and, respectively, in the appertaining transition area from the well bottom to the well wall, said zero passage having a particularly advantageous effect on the stiffness and strength of the well and on its resonance behavior.

Accordingly, the well can also have one or more second bottom ribs that reinforce the well bottom and that, in turn, are oriented and arranged perpendicular to the first bottom ribs, whereby at least one second bottom rib and at least one associated second wall rib are arranged in a shared vertical plane and are shaped in such a way that the profile structure of the second bottom rib adjoins the profile structure of the associated second wall rib in the transition area from the well bottom to the well wall, and whereby the shaping of said second wall rib is changed with respect to the shaping of the second bottom rib in such a manner that the second bottom rib is shaped towards the inside of the well, while the associated first wall rib is shaped towards the outside of the well, or vice versa. This measure also makes an advantageous contribution to the defined selection of the strength and stiffness of the well and also of its resonance behavior.

If, in an advantageous manner, a plurality of adjacent bottom ribs and adjacent wall ribs associated with the bottom ribs are provided, the adjacent bottom ribs and the adjacent wall ribs are alternately shaped towards the inside of the well or towards the outside of the well, as a result of which corrugated cross sections can be created or are created in the well bottom and in the well wall which, in turn, adjoin each other in the undeformed tension-stiff and compression-stiff edge area of the well and which are, at the same time, affixed in the form of a stiff tension-compression band in the circumferential direction of the well.

As is likewise provided by the invention, according to a first practical configuration, a plurality of first bottom ribs and associated first wall ribs and/or a plurality of second bottom ribs and associated second wall ribs can be oriented and arranged axially parallel to each other, as a result of which wells having bottoms that predominantly have a base that resembles the base of a polygon can be advantageously provided with the rib structure according to the invention over a large surface area. In contrast, it can also be conducive for a plurality of first bottom ribs and associated first wall ribs to be oriented and arranged with respect to each other in such a way that a spoke-shaped or star-shaped rib pattern is formed, as a result of which especially wells having bottoms that, at least in certain sections, have a rounded or circular base can be advantageously provided with the rib structure according to the invention over a large surface area.

In a particularly advantageous configuration of the invention, a plurality of first and/or second bottom ribs and associated wall ribs can be arranged in such a manner that the transition area from the well bottom to the well wall, at least in certain sections, is configured in the form of the above-mentioned tension-compression band integrated into said transition area in the circumferential direction of the well, said band completely enclosing the bottom surface of the well bottom and holding it under tension, so to speak, if the rib pattern has been configured optimally.

When it comes to the well itself, it can advantageously be shaped as one piece into a bottom plate made of a metal, a plastic, a composite material or any other conceivable suitable material, or else as a separate, prefabricated add-on part made of said material which is then inserted into a prepared opening in the bottom plate and subsequently attached to it. Likewise advantageously, the well here can be made by means of a familiar deep-drawing process.

BRIEF DESCRIPTION OF THE DRAWINGS

The invention will be explained in greater detail below on the basis of the embodiments schematically depicted in the drawings. The following is shown.

DETAILED DESCRIPTION OF THE INVENTION

Figure 1:
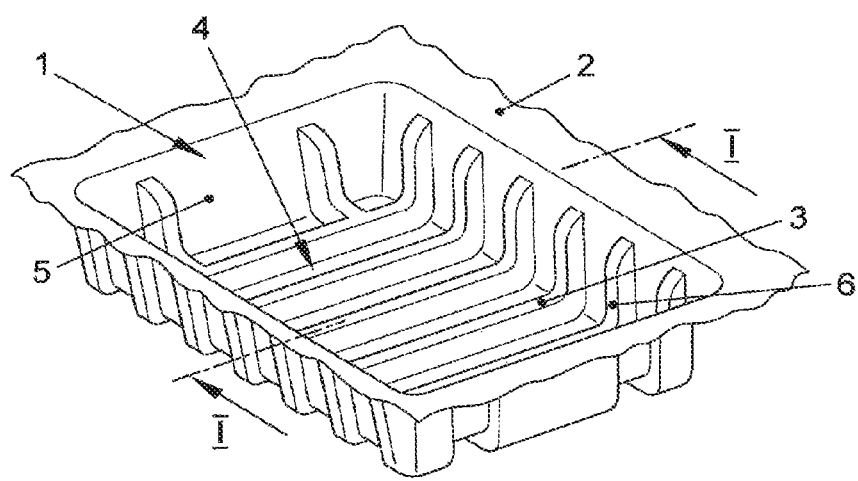
FIG. 1 a perspective view of a well of the generic type, fitted with reinforcement ribs according to the state of the art.

FIG. 1 first shows a well 1 consisting of a blank made of sheet metal or plastic according to a familiar, and consequently not further elaborated, deep-drawing process, said well 1 being shaped as one piece into the bottom plate 2 of a car body, especially the body of a motor vehicle, and being made of a metal, a plastic, a composite material or any other conceivable suitable material.

However, it is likewise conceivable for said well 1 to be inserted as a separate add-on part into a prepared opening of a bottom plate 2 and for it to be attached to it, or else to be attached, for example, as an oil pan to a motor block by means of flanges (not shown in greater detail here).

Figure 2:
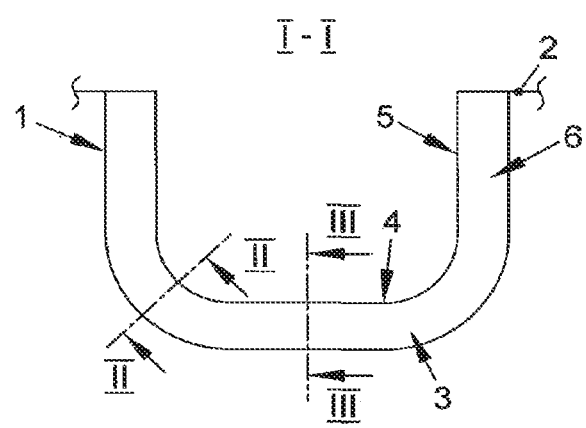
FIG. 2 the section I-I according to FIG. 1.
Figure 3:
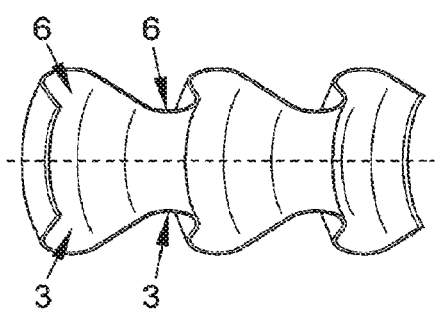
FIG. 3 a detailed view of the transition area from the well bottom to the well wall of said well according to FIG. 1.

In a manner similar to the known state of the art (see, for instance, the German laid-open document DE 102 29 752 A1 acknowledged above), the well 1 has a plurality of bottom ribs 3 which are largely oriented and arranged axially parallel to each other and which, in turn, in the transition area from the well bottom 4 to the well wall 5, make the transition to at least one wall rib 6 arranged in the same vertical plane (see FIGS. 1 to 3). Here, the bottom rib 3 makes the transition at both ends to a wall rib 6, that is to say, the bottom rib 3 and each of the associated wall rib(s) 6 are configured essentially identically, namely, either shaped towards the inside of the well or towards the outside of the well, and the profile structure of the bottom rib 3 makes a transition to the profile structure of the wall rib(s) 6 without any interruptions. Accordingly, the appertaining profile structure of the bottom and wall rib(s) 3, 6 is essentially retained, even in the transition area from the well bottom 4 to the well wall 5.

Especially as can be further seen in FIGS. 1 and 3, adjacent bottom ribs 3 and adjacent wall ribs 6 are alternately shaped towards the inside or towards the outside of the well, in other words, the shaping of adjacent bottom and wall ribs 3, 6 is reversed from one rib to the next.

Figure 4:
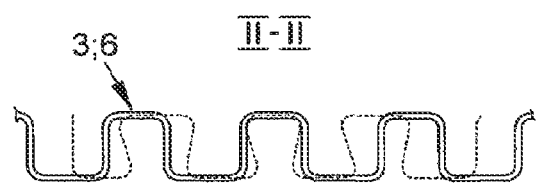
FIG. 4 the section II-II of the well according to FIG. 2, in the loaded and unloaded states of the well.
Figure 5:
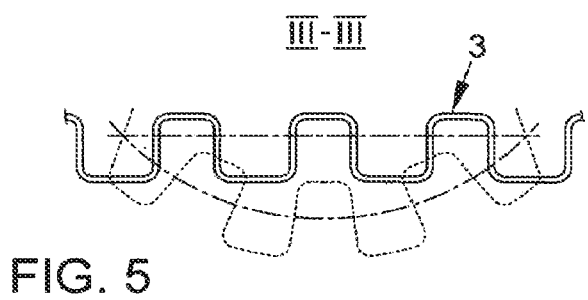
FIG. 5 the section III-III of the well according to FIG. 2, in the loaded and unloaded states of the well.

As has already been elaborated upon above, such a rib structure or such a rib pattern according to the state of the art brings about a relatively tension-soft and compression-soft transition area from the well bottom 4 to the well wall 5, or respectively, to the edge area of the well bottom 4, which, due to static stresses caused by rated loads as well as by excessive loads, detrimentally tend to greater deformation in an accordion-like manner, and to increased natural vibrations in the bottom during driving. By way of an example, FIGS. 4 and 5 schematically depict said tension-soft and compression-soft transition area from the well bottom 4 to the well wall 5 of said well 1 and of the well bottom 4 thereof, whereby a load-free state is indicated by a solid line, while a loaded state is depicted by a broken line.

In order to counter the above-mentioned disadvantageous situation, according to FIGS. 6 to 11, a well 1' in the bottom plate 2' of a car body, especially of the body of a motor vehicle, is now being proposed which has one or more first bottom ribs 3' that reinforce the well bottom 4' as well as one or more first wall ribs 6' that reinforce the well wall 5', whereby at least one first bottom rib 3' and at least one associated first wall rib 6' are arranged in a shared vertical plane and shaped in such a way that the profile structure of the first bottom rib 3' in the transition area from the well bottom 4' to the well wall 5' adjoins the profile structure of the associated first wall rib 6' but so that, in contrast to the conventional configuration described above, the shaping of the first wall rib 6' with respect to the shaping of the first bottom rib 3' is changed in such a way that the first bottom rib 3' is shaped towards the inside of the well, while the associated first wall rib 6' is shaped towards the outside of the well, or vice versa. The shaping of associated bottom and wall ribs 3', 6' is reversed, in a manner of speaking, or else pulled over.

Figure 6:
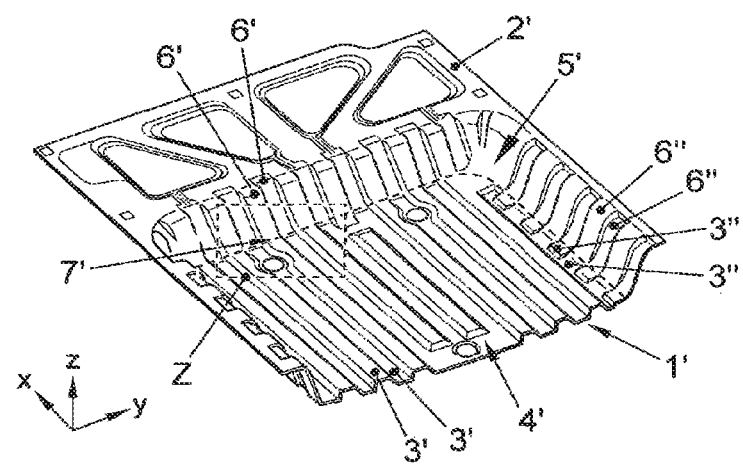
FIG. 6 a perspective view of a well, which is open on the front and configured according to the invention.

FIG. 6 shows a well 1' configured in this way, which here is formed in one piece in the rear area of a bottom plate 2' of a motor vehicle, and which forms a trunk well that is open to the rear and that is closed by a rear skirt which is not shown in greater detail here but which is familiar and which extends in the crosswise direction of the vehicle (Y direction).

Figure 7:
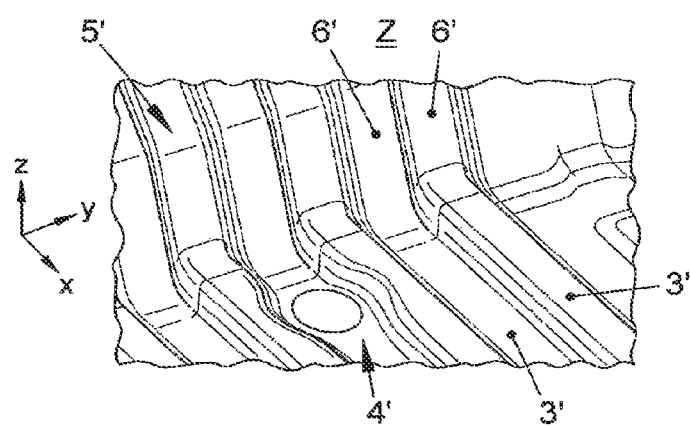
FIG. 7 view "Z" according to FIG. 6.
Figure 8:
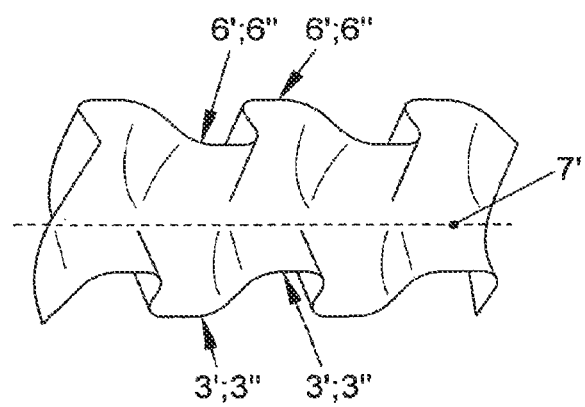
FIG. 8 a detailed view of the transition area from the well bottom to the well wall of said well according to FIG. 7.

In particular, FIG. 6 depicts a rib pattern that first shows a plurality of elongated first bottom ribs 3' that are arranged virtually axially parallel or adjacent to each other and that also extend in the lengthwise direction of the vehicle (X direction), said first bottom ribs 3' being shaped alternatingly towards the inside of the well and towards the outside of the well as seen in the crosswise direction of the vehicle (Y direction) (in particular, also see FIGS. 7 and 8).

According to the invention, there is a first wall rib 6' that adjoins the face of selected first bottom ribs 3' in a shared vertical plane, whereby the connection is provided in said transition area from the well bottom 4' to the well wall 5', and whereby the shaping of the associated bottom and wall ribs 3', 6' is reversed in the manner described above.

By means of this measure, in the transition area from the well bottom 4' to the well wall 5' or in the transition area from the bottom rib 3' to the associated wall rib 6', an essentially undeformed tension-stiff and compression-stiff area is created which has an advantageous effect on the stiffness and strength of the well and on its resonance behavior.

If, as depicted in FIGS. 6 to 8, a plurality of bottom wall ribs 3' and associated wall ribs 6' arranged next to each other are provided, this advantageously yields a stiff tension-compression band 7' that is integrated into said transition area and that extends along the transition area, that is to say, in the circumferential direction of the well 1, and that imparts the well 1' with greater stiffness and strength.

In view of the fact that, according to FIG. 6, the well bottom 4' of the well 1' has an essentially rectangular base, that is to say, a base that approximates that of a polygon, in the transition areas from the well bottom 4' to the well wall 5' which are arranged virtually axially parallel to the first bottom ribs 3' and that are unreinforced so far, it is advantageously conducive to provide second bottom ribs 3" with associated second wall ribs 6" according to the invention that are oriented and arranged perpendicular to said first bottom ribs 3'. Through this measure, it is possible to configure virtually the entire transition area from the well bottom 4' to the well wall 5' as a stiff tension-compression band 7' in the circumferential direction of the well 1'.

Consequently, the first bottom wall ribs 3' and the first wall ribs 6' can be referred to as the main ribs, while the second bottom ribs 3" and the second wall ribs 6" are designated as secondary ribs.

Figure 9:
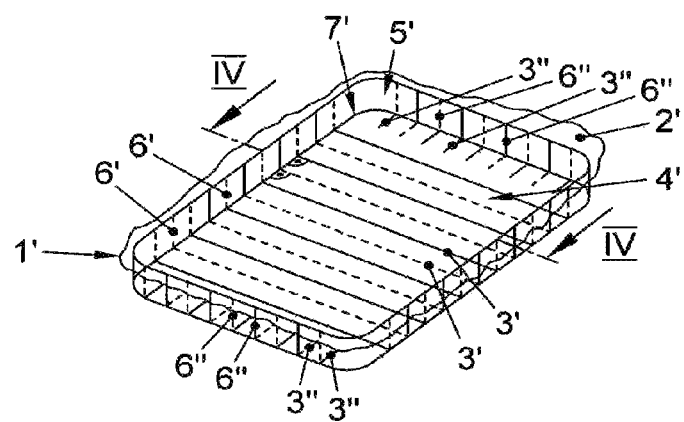
FIG. 9 a perspective view of a well which is circumferentially closed and configured according to the invention.
Figure 10:
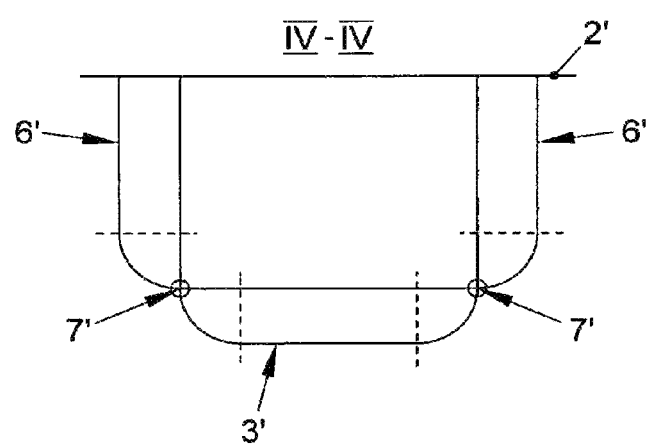
FIG. 10 the section IV-IV according to FIG. 9.

The embodiment according to FIGS. 9 and 10 differs from the previous ones in that it shows a circumferentially closed well 1' that has been provided according to the invention with first bottom ribs 3' and first wall ribs 6' as well as second bottom ribs 3" and second wall ribs 6", whereby here, for the sake of clarity, the rib tracks of the differently shaped bottom ribs 3', 3" and wall ribs 6', 6" are depicted in an extremely schematic form.

Thus, for instance, the rib tracks of the bottom ribs 3', 3" and wall ribs 6', 6" shaped towards the inside are drawn with a solid line, while the rib tracks of the bottom ribs 3', 3" and wall ribs 6', 6" shaped towards the outside are drawn with a broken line. The rib pattern has been chosen in such a way that an encircling stiff tension-compression band 7' is created in the transition area from the well bottom 4' to the well wall 5'.

The above-mentioned embodiments are focused essentially on a well 1' having a plurality of bottom ribs 3', 3" and associated wall ribs 6', 6" which, in turn, are oriented and arranged virtually axially parallel to each other.

The invention, however, is not restricted to these embodiments, but rather, it also encompasses spoke-shaped or star-shaped rib patterns either alone or in combination with one or more rib patterns that provide for a virtually axially parallel orientation and arrangement of a plurality of bottom ribs 3', 3" and associated wall ribs 6', 6" (not shown in greater detail here).

Figure 11:
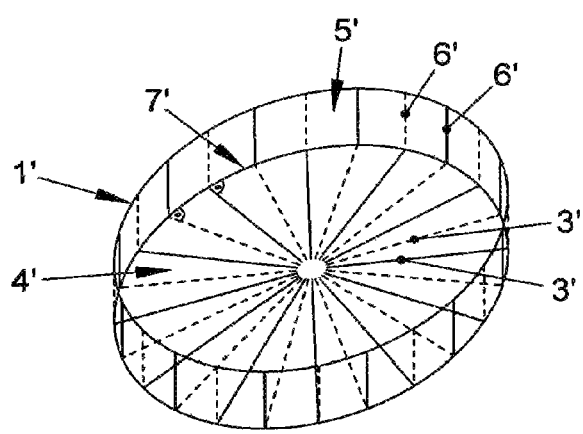
FIG. 11 a circumferentially closed well according to a second embodiment variant.

For instance, FIG. 11 shows a well 1' having a circular base, whereby preference is given to a star-shaped rib pattern in which first bottom ribs 3' extend from a center section of the well bottom 4' radially towards the outside and adjoin first wall ribs 6' associated according to the invention. Here, too, for the sake of clarity, the rib tracks of the differently shaped first wall ribs 3' and first bottom ribs 6' are only depicted extremely schematically, whereby the rib tracks of the wall ribs 3' and bottom ribs 6' shaped towards the inside of the well are drawn with a solid line, while the rib tracks of the wall ribs 3' and bottom ribs 6' shaped towards the outside of the well are drawn with a broken line. The rib pattern is selected in such a way that an encircling stiff tension-compression band 7' is created in the transition area from the well bottom 4' to the well wall 5'.

Furthermore, the figures in the drawing show first and second bottom ribs 3', 3" which are oriented with respect to a tangent (not shown here) laid perpendicularly (at an angle of 90°) on a rectilinear transition area from the well bottom 4' to the well wall 5' (see, in particular, FIGS. 6 to 9) or perpendicularly (at an angle of 90°) on a curved transition area from the well bottom 4' to the well wall 5'. According to the invention, first and second wall ribs 6', 6" then adjoin said first and second bottom ribs 3', 3".

Figure 12:
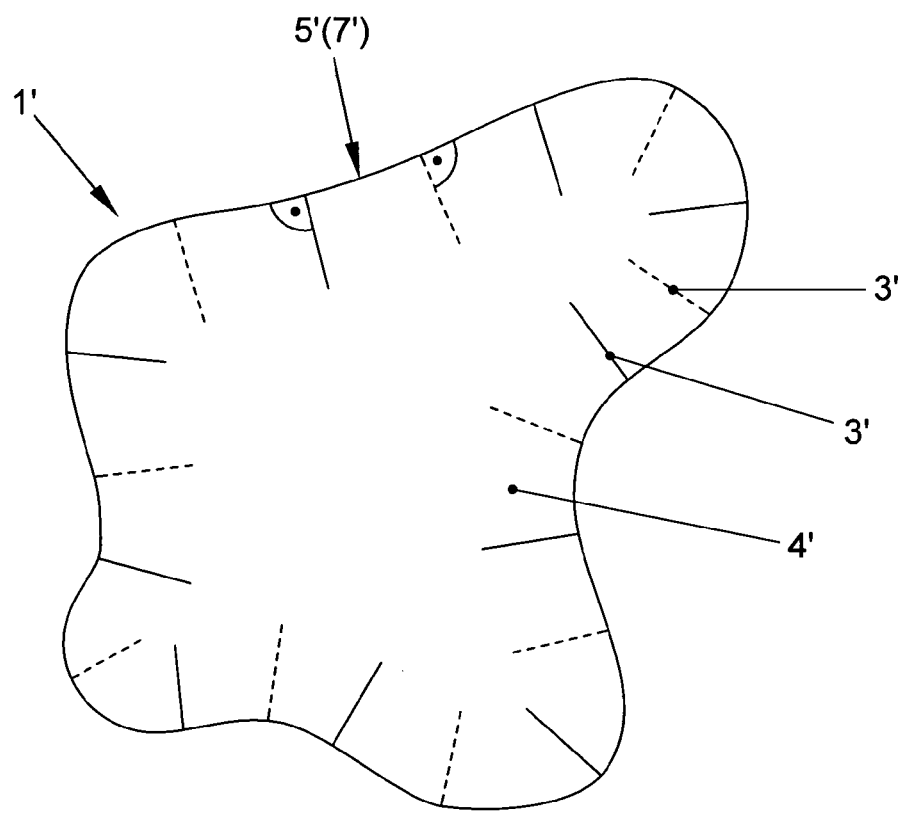
FIG. 12 a circumferentially closed well according to a third embodiment variant.

Finally, FIG. 12 shows a top view of the base of a well bottom 4' whose outer contour is characterized by a free-form curve having a certain (any desired) number of curves. As can be seen, a plurality of rib tracks of first bottom ribs 3' are arranged so as to be distributed virtually uniformly over the edge area of the well bottom 4' and perpendicular (at an angle of 90°) with respect to a tangent (not shown here) laid on a curved transition area from the well bottom 4' to the well wall 5'. According to the invention, first wall ribs 6' (not shown in greater detail here) adjoin said first bottom rib 3'.

Conversely, it can also be conducive, and accordingly it is also encompassed by the invention, for first and second bottom ribs 3', 3" to be oriented with respect to a tangent (not shown here) laid at an angle that deviates from the perpendicular, in other words, at an angle different from 90°, on said rectilinear transition area from the well bottom 4' to the well wall 5', or with respect to a tangent laid on a curved transition area from the well bottom 4' to the well wall 5', as a result of which the special reinforcement requirements can be taken into account to a great extent (not shown in greater detail here).

LIST OF REFERENCE NUMERALS

1 well
2 bottom plate
3 bottom rib
4 well bottom
5 well wall
6 wall rib
1' well
2' bottom plate
3' first bottom rib
3" second bottom rib
4' well bottom
5' well wall
6' first wall rib
6" second wall rib
7' tension-compression band

The invention claimed is:
1. A well in a plate of a vehicle, the well comprising:
    a well bottom which makes a transition to a well wall,
    at least one first bottom rib that reinforces the well bottom and at least one first wall rib that reinforces the well wall associated therewith,
    wherein the at least one first bottom rib and the at least one associated first wall rib are arranged in a shared vertical plane and are shaped in such a way that a profile structure of the at least one first bottom rib adjoins a profile structure of the associated at least one first wall rib in a transition area from the well bottom to the well wall, and wherein a shape of the at least one first wall rib with respect to a shape of the at least one first bottom rib is changed in such a manner that the at least one first bottom rib is shaped towards an inside of the well, while the at least one associated first wall rib is shaped towards an outside of the well, or vice versa.

2. The well according to claim 1, wherein the well is arranged in a bottom plate of a car body.

3. The well according to claim 1, wherein the well has one or more at least one second bottom rib that reinforces the well bottom and that is oriented and arranged perpendicular to the at least one first bottom rib, wherein the at least one second bottom rib and at least one associated second wall rib are arranged and shaped in a shared vertical plane in such a way that a profile structure of the at least one second bottom rib adjoins a profile structure of the at least one associated second wall rib in the transition area from the well bottom to the well wall, and wherein a shape of the at least one second wall rib is changed with respect to a shape of the at least one second bottom rib in such a manner that the at least one second bottom rib is shaped towards the inside of the well, while the at least one associated second wall rib is shaped towards the outside of the well, or vice versa.

4. The well according to claim 1, wherein, in a plurality of adjacent bottom ribs and adjacent wall ribs associated with the adjacent bottom ribs, the adjacent bottom ribs and the adjacent wall ribs are alternately shaped towards the inside of the well and towards the outside of the well.

5. The well according to claim 1, wherein a plurality of first bottom ribs and associated first wall ribs and/or a plurality of second bottom ribs and associated second wall ribs are oriented and arranged virtually axially parallel to each other.

6. The well according to claim 1, wherein a plurality of first bottom ribs and associated first wall ribs are oriented and arranged with respect to each other in such a way that a spoke-shaped or star-shaped rib pattern is formed.

7. The well according to claim 1, wherein the well bottom has a base that resembles the base of a polygon.

8. The well according to claim 1, wherein the well bottom, at least in certain sections, has a rounded or circular base.

9. The well according to claim 1, wherein, a plurality of first and/or second bottom ribs and a plurality of associated first and/or second wall ribs are arranged such that a transition area from the well bottom to the well wall, at least in certain sections, is configured in the form of a tension-compression band integrated into said transition area.

10. The well according to claim 1, wherein the well is shaped as one piece into a bottom plate, or is shaped as a separate add-on part that is then inserted into, and attached to, an opening prepared in the bottom plate, wherein the well is made of a material selected from the group consisting of a metal, a plastic, a composite material and any other conceivable suitable material.

11. The well according to claim 10, wherein the well is made by a deep-drawing process.

* * * * *